United States Patent [19]

Gabeler

[11] Patent Number: 4,920,255
[45] Date of Patent: Apr. 24, 1990

[54] AUTOMATIC INCREMENTAL FOCUSING SCANNER SYSTEM

[75] Inventor: Stephen C. Gabeler, Sudbury, Mass.

[73] Assignee: Stephen C. Gabeler, Canton, Mass.

[21] Appl. No.: 264,872

[22] Filed: Oct. 31, 1988

[51] Int. Cl.$^5$ .......................... G06K 7/10; G06K 7/14
[52] U.S. Cl. ................................... 235/454; 235/472
[58] Field of Search ............................... 235/454, 472

[56] References Cited

U.S. PATENT DOCUMENTS 4,794,237  12/1988  Ferrante .............................. 235/454

Primary Examiner—Harold I. Pitts
Attorney, Agent, or Firm—Joseph S. Iandiorio

[57] ABSTRACT

An automatic incremental focusing scanner system which optically reads a code pattern on an object. The system includes a scanner which directs a beam of radiation onto the object at one of a number of focal lengths. The system further includes a range determining unit for measuring the range of the object relative to the scanner, and a mechanism for alternating the focal length of the radiation beam to selectively focus it as commanded by a control module. The focal length of the beam is adjusted based on the measured range to enable accurate reading of the code pattern.

15 Claims, 6 Drawing Sheets

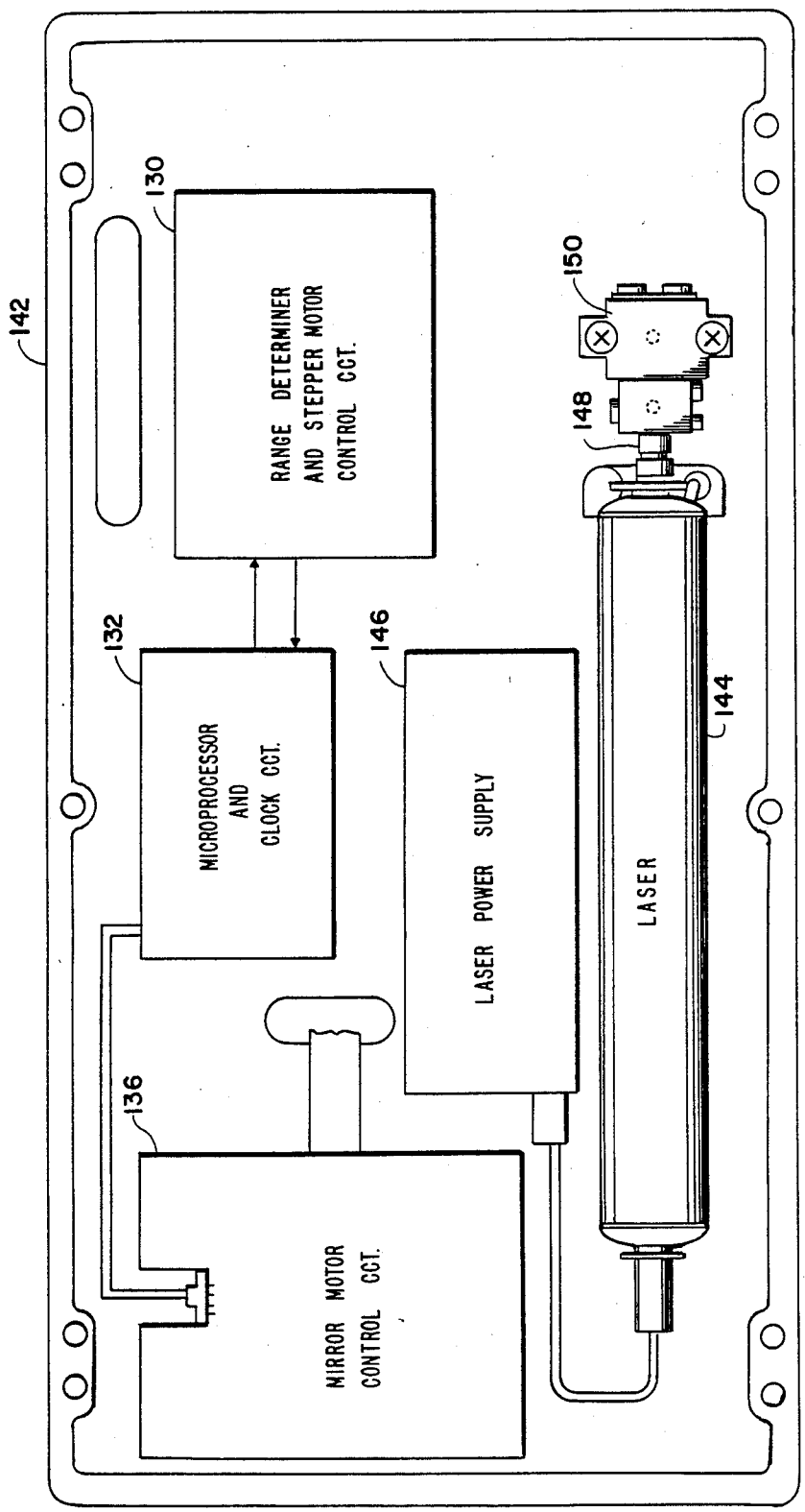

AUTOMATIC INCREMENTAL FOCUSING SCANNER SYSTEM

FIELD OF INVENTION

This invention relates to a system which automatically adjusts the focus of an optical scanner of machine readable code and more particularly to such a system which precisely determines the range of an object carrying the code and optimally focuses the scanner to accurately read the code on the object.

BACKGROUND OF INVENTION

There are a number of systems which optically read a code pattern such as a bar code on a package or other object. For high speed applications, scanners operate effectively over only a narrow range of distance. The narrow operating distance arises from the need to reduce the diameter of an optical scanning beam to approximately the width of the smallest element to be read. For a bar code of black bars and white spaces, for example, individual bars can have a width as small as five mils (0.005 inch) or less. Many lasers commonly used in optical scanning systems emit a beam having a diameter of thirty to forty mils which must be reduced to eight mils or less to read the narrow bars of these smaller codes. Further, as the distance between the scanner and the code increases, faster clock elements are required because the beam travels a greater distance—and therefore at a faster rate—during each sweep as the range increases.

There are a number of situations in which it is not possible to maintain a uniform distance between the scanner and the code to be read. In the furniture industry, for example, a number of dramatically different sized boxes can pass beneath a scanner can the same conveyor belt. A large box containing a desk or chair can be forty or fifty inches high or more, whereas a box containing a table top is less than two inches in height.

Presently, there are several types of systems which attempt to accommodate a variable range between the code and the scanner. One system utilizes two or more sets of fixed focus scanners, one set focused at a close range of one to thirty inches, and a second set focused at thirty to sixty inches, for example. However, the scanners are expensive and complicate installation, operation and maintenance of the system. Further, due to divergence of the focal point of each set, resolution may not be acceptable at ranges intermediate to the close and far ranges.

Another system involves a vertically oriented scanner with two-position focusing. The system includes two additional optical devices for providing light beams across a conveyor belt, a lower team to detect the presence of a package and a higher beam which, when broken, commands the scanner to shift from far focus to near focus. All of the above systems only provide coarse focusing which dramatically limits their resolution of codes on variable sized boxes.

SUMMARY OF INVENTION

It is therefore an object of this invention to provide an automatic incremental focusing scanning system which accurately focuses an optical beam over greatly different distances at high speeds.

It is a further object of this invention to provide such a system which accurately establishes a narrow-diameter beam spot at different scanning ranges.

It is a further object of this invention to provide such a system which can read smaller-sized bar code elements at greater distances.

It is a further object of this invention to provide such a scanning system which provides greater depth of field at different scanning ranges.

A still further object of this invention is to provide an automatic focusing scanning system which is not restricted to a horizontal or a vertical viewing orientation.

It is a further object of this invention to provide such a system which is less costly and provides greater flexibility for changes in height or distance of different objects relative to the scanning system.

This invention results from the realization that a truly effective system for optically reading a code pattern on a moving object can be achieved by determining the range of the object to a scanner having an adjustable lens assembly, and adjusting the lens assembly to one of a large number of incremental positions to optimally focus a laser beam onto the object to establish a beam diameter at the measured range which is sufficient to resolve minimal width elements of the code pattern.

This invention features an automatic incremental focusing scanner system for optically reading a code pattern on an object. The scanner system includes scanner means for directing a radiation beam onto the object at one of a plurality of focal lengths. The system further includes range means for determining the range of the object relative to the scanner means, and means for altering the focal length to selectively focus the radiation beam. Control means, responsive to the range means, commands the means for altering to adjust the focal length based on the determined range to enable accurate reading of the code pattern.

In one embodiment, the range means includes means for emitting at least one pulse of radiation and means for receiving a reflected pulse derived from the pulse of radiation. The means for emitting and receiving may be an ultrasonic transducer which transmits an ultrasonic pulse and develops an echo signal upon receipt of an echo pulse derived from the ultrasonic pulse. The range means further includes means for generating a range signal from the echo signal and for providing the range signal to the control means. The means for altering includes a lens assembly through which the radiation beam is directed. A first lens in the lens assembly is incrementally adjustable to one of a plurality of positions relative to a second lens of the assembly. A stepper motor adjusts the position of the first lens.

The scanner may include a radiation source such as a laser for producing polarized, collimated radiation. The system may further include means for detecting the presence of the object proximate to the path of the radiation beam and for providing a presence signal to the control means. When the object is movable relative to the scanner means, it is desirable for the range means to be positioned to measure the range before the object enters the path of the radiation beam.

DISCLOSURE OF PREFERRED EMBODIMENT

Other objects, features and advantages will occur from the following description of a preferred embodiment and the accompanying drawings, in which:

FIGS. 6A and 6B are diagram of some of the hardware component of the system shown in FIG. 2 mounted on different sides of a common base.

This invention may be accomplished by a scanner system which measures the range of an object relative to a scanner before reading a code pattern on the object. The scanner includes a lens assembly having an adjustable focal length. Based on the measured range of the object, the focal length is adjusted to one of a large number of focal lengths to accurately read the code pattern.

Figure 1:
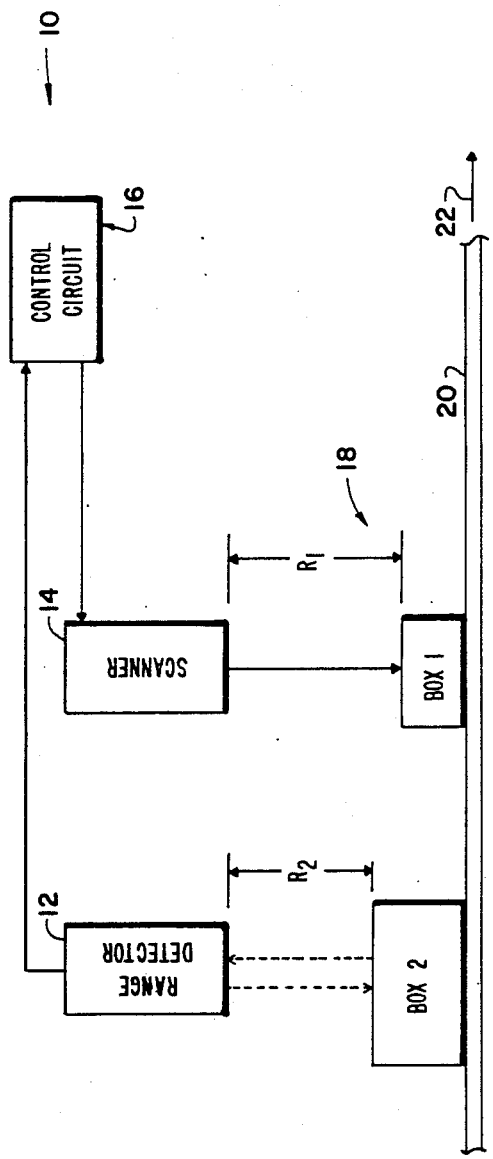
FIG. 1 is a schematic diagram of an automatic incremental focusing scanner system according to this invention for viewing boxes of different heights.

Automatic incremental focusing scanner system 10, FIG. 1, includes range detector 12, scanner 14, and control circuit 16. Scanner system 10 optically reads bar code patterns an objects 18, such as box 1 and box 2 on moving conveyor belt 20. One type of bar code pattern, and signals generated by a scanner system reading the pattern, are disclosed by Gabeler, U.S. Pat. No. 4,121,121, incorporated herein by reference.

The focal length or a lens assembly, within scanner 14 in this construction, is set by control circuit 16 based on the range determined by detector 12. As shown, boxes 1 and 2 are moving in the direction indicated by arrow 22. When box 1 was beneath range detector 12, range $R_1$ was measured and a range signal was provided to control circuit 16. Control circuit 16 then command scanner 14 to set the focal length of the assembly to an optimal focal length for range $R_1$. Scanner 14 is shown reading a code pattern on box 1 at that optimal focal length. Range detector 12 is shown measuring a new range $R_2$. After the code pattern on box 1 is read, control length to accommodate range $R_2$ when box 2 passes beneath scanner 14.

When conveyor belt 22 moves at a constant rate and objects 18 are placed at uniform intervals, control circuit 16 can command adjustment of the focal length of scanner 14 and accept scan information at predetermined time periods. Frequently, however, the conveyor belt is stopped and started at random and objects are placed at varying positions along the conveyor belt. Scanner system 30 according to this invention, FIG. 2, includes presence detector 32 which detects the presence of an object 34 such as roll 1. Scanner control circuit 36 continuously stores range information from range detector 38, but does not alter the focal length of lens assembly 40 of scanner 42 once the presence of an object is detected and a code pattern has not yet been identified for that object. In this construction, presence detector 32 includes a photo cell which monitors light beam 44 from light source 46. Roll 1 is shown interrupting light beam 44, and presence detector 32 communicates the presence of roll 1 to scanner control circuit 36. Laser 48 produces radiation beam 50 which is directed by mirrors through lens assembly 40 and is projected as beam 52 onto roll 1. Detector 54 receives reflected radiation 56 and transmits analog width coded information to analog-to-digital converter 58 which transmits the signal as digital width coded information to clock circuit 60, described in depth below in relation to FIG. 5. The number of counts per code pattern element are then transmitted to decode logic 62 which translates the pattern, validates the code information, and provides the information for conventional processing.

Figure 3A:
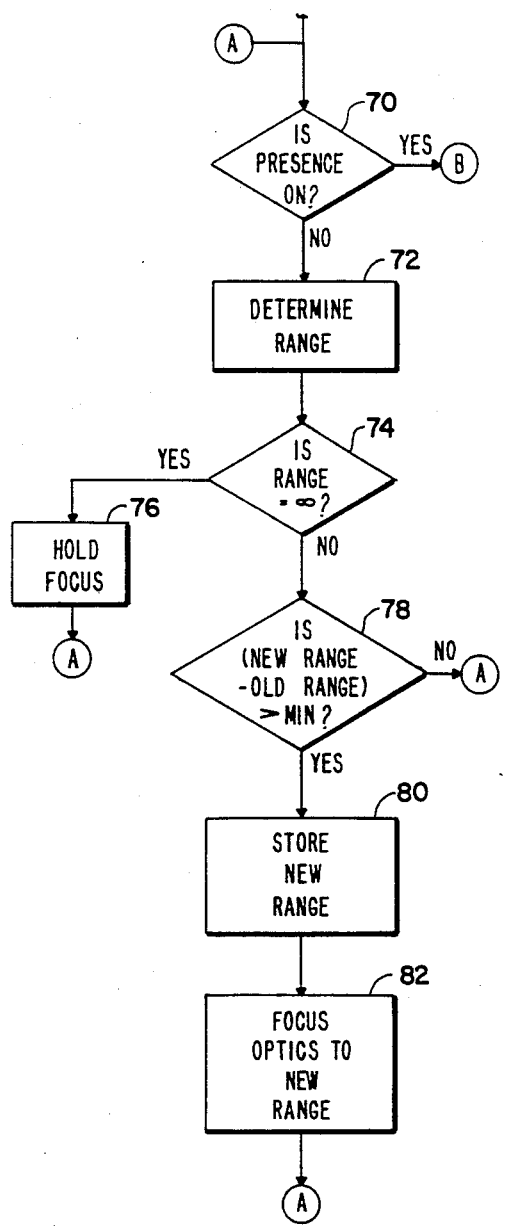
FIGS. 3A and 3B are flow charts of the operation of the scanner control circuit shown in FIG. 2.
Figure 3B:
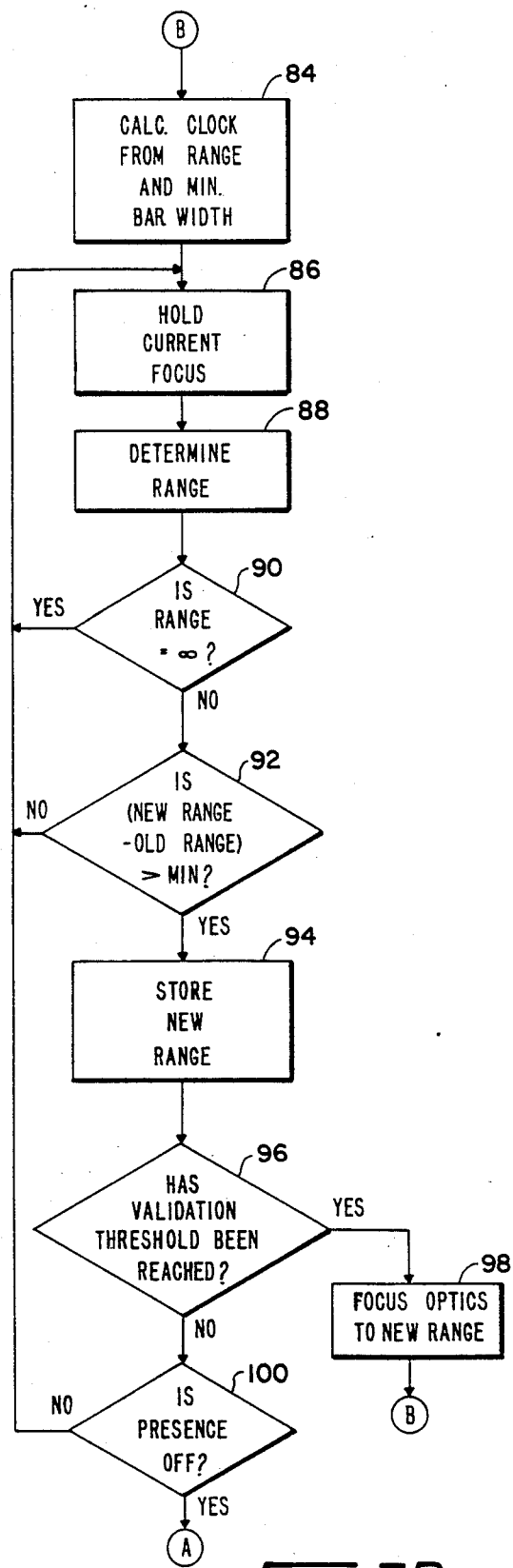

The operation of scanner control circuit 36 is shown in FIGS. 3A and 3B. If the presence of an object 34 is not sensed by presence detector 32, the operation proceeds from step 70, FIG. 3A, to step 72 in which the range is determined from range information supplied by detector 38. In one construction range detector 38 includes a transducer for emitting an acoustic pulse as described below. If the range is measured, step 74, to be infinity, or otherwise beyond a predetermined maximum distance, the focus of lens assembly 40 is held constant, step 76, and the operation returns to step 70. Otherwise, if the difference between the new range and the old range is greater than a preselected minimum, step 78, the new range is accepted and stored, step 80 and the optics of lens assembly 40 are focused to accommodate the new range, step 82. The decision at step 78 minimizes "hunting" in which the optics of lens assembly 40 are continuously and unnecessarily adjusted by small increments even though the original focus would suffice. The operation proceeds from step 78 to step 70 if the old focus is acceptable.

When presence is "on", indicating that an object is in the path of the scanner beam, the rate at which the digital width coded information is clocked by clock circuit 60 is calculated as represented by step 84, FIG. 3B. Calculation of the clock rate is described in more detail below in relation to FIGS. 4 and 5. An initial clock rate is calculated when the presence of an object is first detected. The current focus, which was set at step 82, FIG. 3A, or was left unchanged at step 78, is held, step 86, FIG. 3B. Range information from detector 38 is continuously monitored, step 88 and if the range is at infinity, step 90, the operation returns to step 86. If the range is less than a preselected maximum, the difference between the new range and the old range is determined, step 92 and a new range is stored, step 94 if the difference is sufficiently large. If a code validation threshold has been reached, step 96, as computed by decode logic 62, FIG. 2, the optics of lens assembly 40 are focused to accommodate the new range, step 98, and the operation proceeds to step 84 at which a new clock rate is calculated. Step 96 enables the scanning system to anticipate a new range as soon as a code pattern has been fully read, even though the object may still be in the path of scanner 42 and presence detector 32. This anticipation capability is especially important for high speed applications. If the bar code pattern has not been decoded and the presence has not changed to "off", step 100, the logic establishes a loop through step 86. Otherwise, the operation proceeds to step 70, FIG. 3A.

The ability to focus rapidly and accurately to accommodate a wide variety of distances is crucial for high-speed scanning of rapidly moving objects. Rolls 1 and 2, FIG. 2, for example represent rolls of paper stock having a greatly different width. In one example, roll 1 has a diameter of ten inches while roll 2 has a diameter of eighty inches. Rolls 1 and 2 thus have radii differing by forty inches and the range between the rolls and the scanner can therefore vary by more than forty inches depending on the location of the rolls on the conveyor belt.

Figure 4:
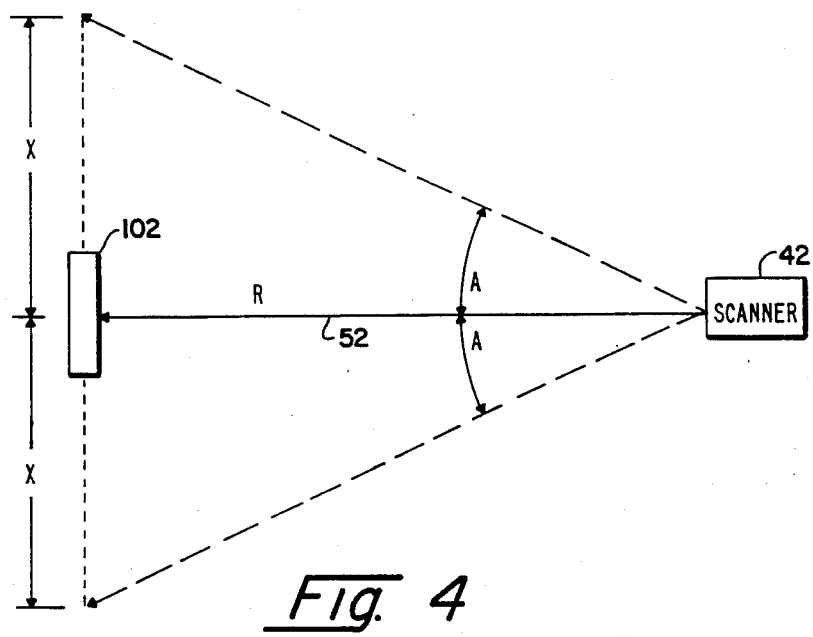
FIG. 4 is a schematic diagram representing the angle over which a scanner beam is swept and the distance traveled by the beam at a particular range.

The distance traveled by scanning beam 52 over the object also varies greatly according to distance between the object and the scanner. As shown in FIG. 4, a bar code pattern 102 is at range R from scanner 42. Beam 52 travels over a total distance represented by 2X; distance X is calculated from range R and angle A. Angle A is determined by the number of mirrors in a rotating mirror wheel, described below. The rate at which beam 52 is scanned across distance 2X also depends on the number of mirrors and the rate at which they revolve. As the number of mirrors increase, the number of scans per second increases and angle A decreases, that is, the scan height decreases.

In addition, the maximum acceptable diameter of beam 52 depends on the width of the minimum element to be read in the code pattern; the diameter of beam 52 at pattern 102 cannot be substantially larger than the minimum width of the smallest code element. Conventional high-speed scanners typically have a maximum effective distance in inches which is approximately 1 to 1.2 times greater than the width of the minimum element measured in mils. By comparison, a scanning system according to the present invention can accommodate distances of more than twice the width of the minimum element: 15 mil element can be read at a range of thirty five inches or more.

The rate at which digital width coded information is counted can overflow conventional counters. To prevent overflow of a conventional counter such as an eight bit counter, clock circuit 60, FIG. 2 operates as described in FIG. 5. The measured range is retrieved, step 110, and the minimum bar width, mirror motor speed, and the number of mirrors are recalled from memory, steps 112, 114, 116. After calculating the sweep rate of beam 52 as described above, a clock rate is calculated, step 118, and the clock rate is set, step 120, to establish four or more clock counts per minimum bar width. For example, if beam 52 travels at one microsecond per mil across code pattern 102, and the minimum bar width is fifteen mils, beam 52 will travel across the minimum bar in fifteen microseconds. A clock rate of one count per three microsecond establishes five counts for that bar width. In another construction, instead of performing the clock calculations as described in FIGS. 3B and 5, the clock rate can be manually adjusted to achieve an acceptable clock rate.

Figure 2:
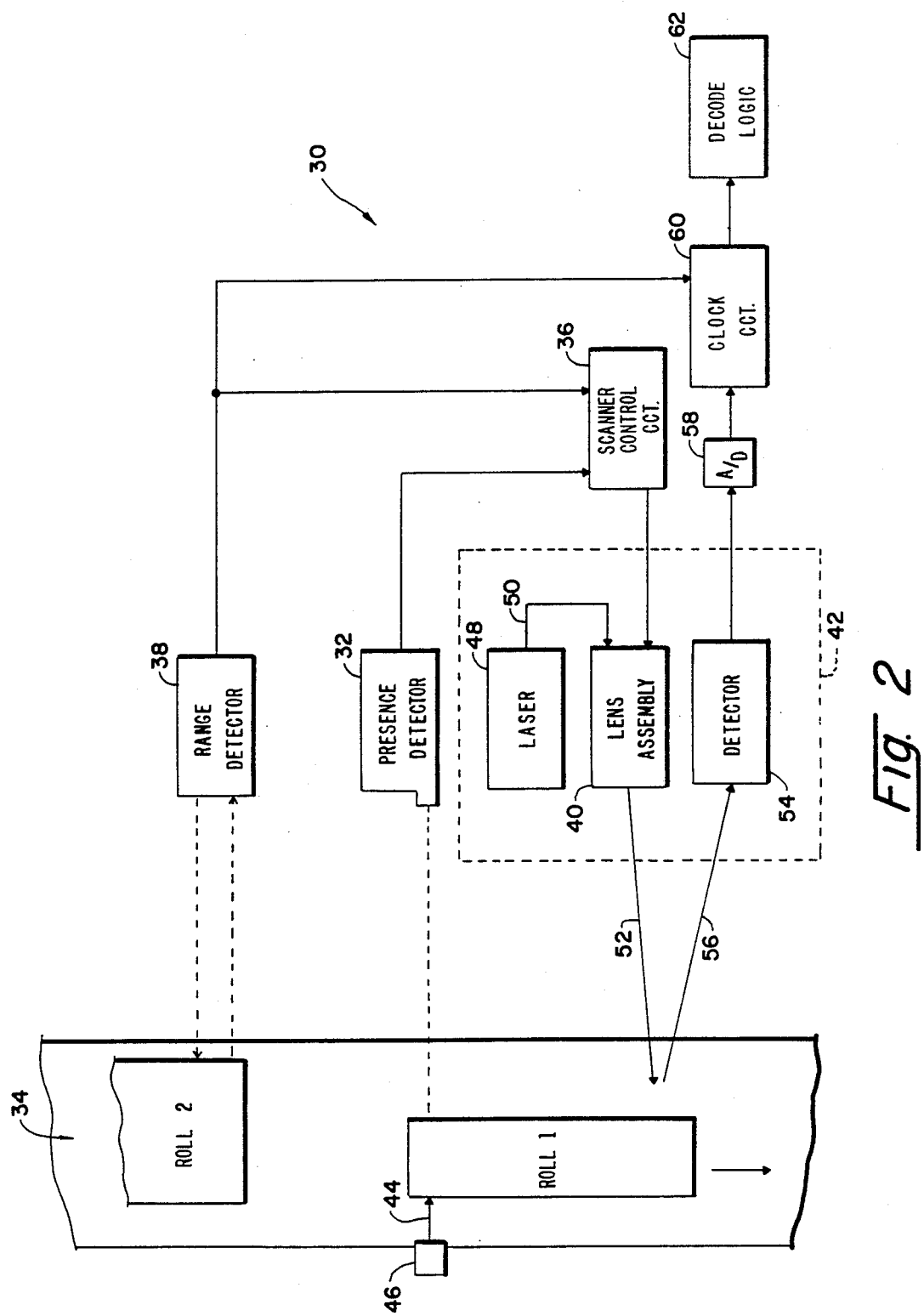
FIG. 2 is a schematic diagram of an alternative scanning system according to this invention having a presence detector, a clock circuit and a scanner control circuit.
Figure 6B:
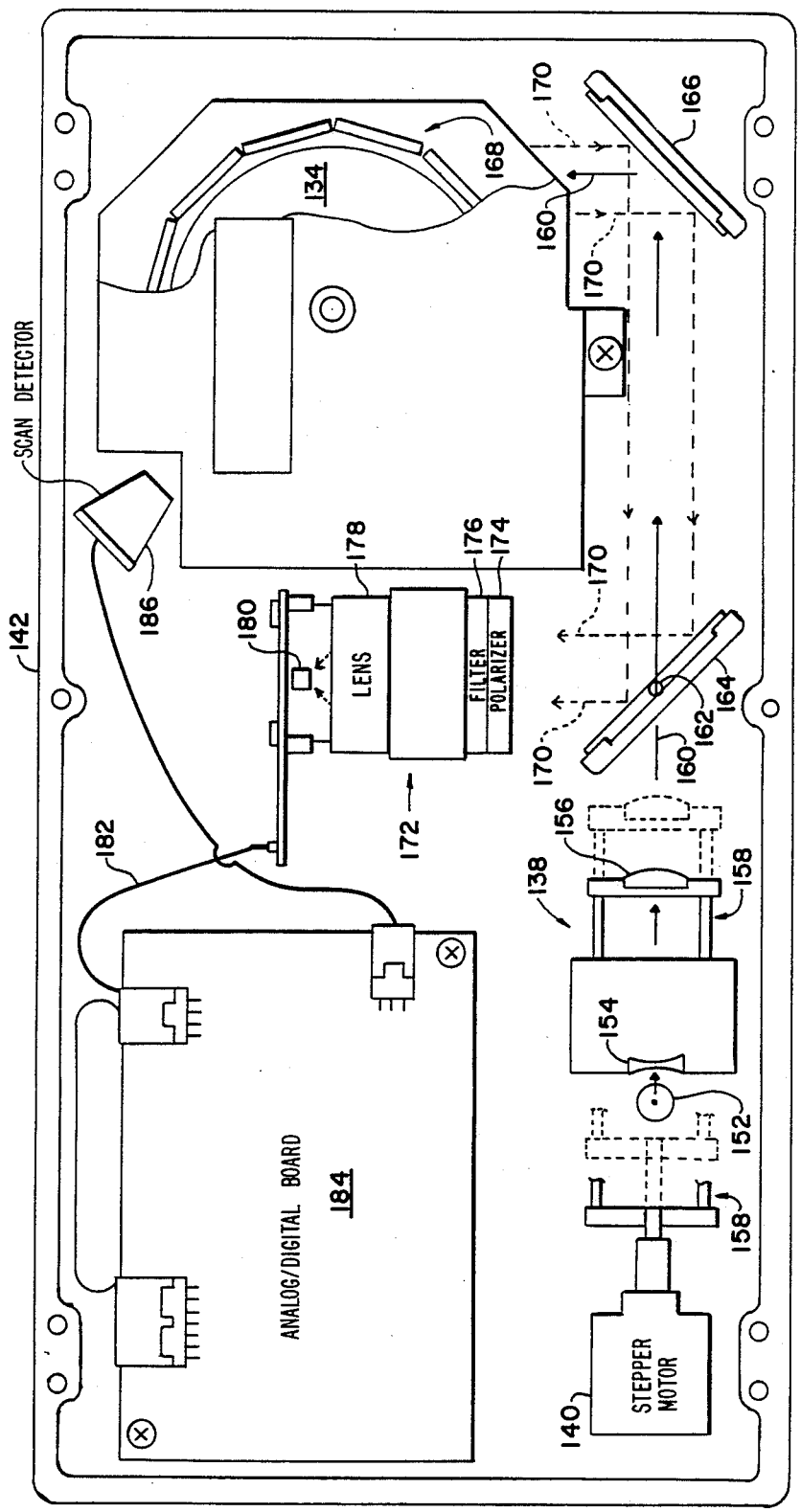

A hardware implementation of system 30, FIG. 2 is shown in FIGS. 6A and 6B. Range detector 38 and presence detector 32 are not shown. As described above, presence detector 32 in this construction establishes a light beam which, when broken, indicates the presence of an object. Range detector 38 includes a model 7000 electrostatic transducer and transducer control board model 607089, both available from Polaroid. The transducer emits acoustic pulses at ultrasonic frequencies and measures the time delay for a returned echo. The transducer develops an echo signal upon receipt of an echo pulse which is derived from an emitted ultrasonic pulse. This unit communicates with range determinor and stepper motor control circuit 130, FIG. 6A which calculates the range in 0.3 inch increments between less than six inches to ten feet. In this construction, some of the capabilities of range detector 38, scanner control 36, clock circuit 60 and decode logic 62 are combined or distributed among different components.

Figure 5:
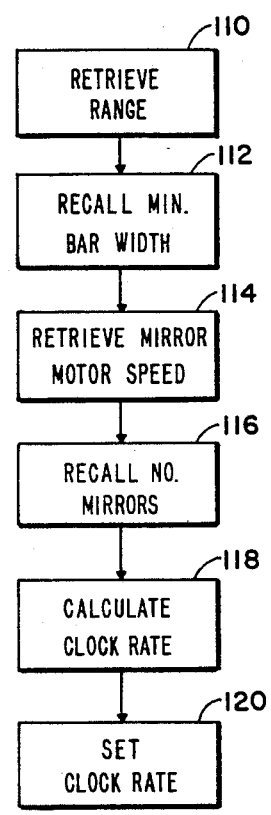
FIG. 5 is a flow chart of the operation of the clock circuit shown in FIG. 2.

For example, the calculation of range from time delay is determined by circuit 130. The operations illustrated in FIG. 3B and FIG. 5 are accomplished by microprocessor and clock circuit 132. The rotation rate of mirror wheel 134, FIG. 6B, is controlled by mirror motor control circuit 136, FIG. 6A. Object presence is provided directly to microprocessor 132 from the remote presence detector. Lens assembly 138 is incrementally adjusted by stepper motor 140 as commanded by control circuit 130 upon a command from microprocessor 132. Microprocessor and clock circuit 132 is typically located on a separate printed circuit board mounted by standoffs to base 142.

During operation, laser 144, FIG. 6A, is powered by power supply 146 and generates a coherent beam of polarized radiation which exits through port 148 and is directed by mirror 150 through base 142 to emerge from hole 152, FIG. 6B. The path of the beam is then altered another ninety degrees by a mirror (not shown) and directed through negative lens 154. The focal length of lens assembly 138 is established by the distance between fixed lens 154 and movable positive lens 156. Lens 156 is carried by slide mechanism 158 which is moved incrementally by stepper motor 140, such as a DC linear actuator. In this construction, lens 156 is moved over a total of 0.5 inches in one hundred twenty eight increments of four mils each. The extended position of positive lens 156 and slide mechanism 158 is shown in phantom.

After being focused to a desired focal length by lens assembly 138, focused beam 160 passes through opening 162 in mirror 164 and is guided by mirror 166 to mirrors 168 of wheel 134. Reflected light 170, indicated in phantom, returns to mirrors 168 and is directed by angled mirrors 166, 164 to detector assembly 172. Detector assembly 172 includes polarizor 174, which minimizes the effects of specular reflection, band pass filter 176, lens 178 and PIN diode 180. In this construction, laser 144 is laser tube model 05-LHP-692 available from Mellesgriot which produces collimated light at 632 nm. Accordingly, filter 176 passes radiation at 632 nm. Lens 178 is constructed to focus far field radiation wholly on diode 180 to enhance reading of code patterns at a large distance, and to focus near field radiation about an area greater than diode 180, thereby decreasing the percentage of light impinging on diode 180, to compensate for the higher intensity of light reflected from close objects.

Analog width coded information is transmitted through line 182 to analog/digital board 184 which provides digital width coded information to microprocessor 132, FIG. 6A. Also provided through board 184 to microprocessor 132 is beginning-of-scan information determined by scan detector 186, FIG. 6B. Scan detector 186 synchronizes detection of reflected light with the position of one of mirrors 168. Microprocessor and clock circuit 132 then processes the information as described above.

Although specific features of the invention are shown in some drawings and not others, this is for convenience only as each feature may be combined with any or all of the other features in accordance with the invention.

Other embodiments will occur to those skilled in the art and are with the following claims:

What is claimed is:

1. An automatic incremental focusing scanner system for optically reading a code pattern on an object, comprising:

scanner means for directing a radiation beam onto the object at one of a plurality of focal lengths;

range means for determining the range of the object relative to said scanner means;

means for altering the focal length to selectively focus the radiation beam; and control means, responsive to said range means, for commanding said means for altering to adjust the focal length established by said means for altering based on the determined range to enable accurate reading of the code pattern.

2. The scanner system of claim 1 in which said range means includes means for emitting at least one pulse of radiation and means for receiving a reflected pulse derived from the pulse of radiation.

3. The scanner system of claim 1 in which said range means includes an ultrasonic transducer for transmitting an ultrasonic pulse and for developing an echo signal upon receipt of an echo pulse derived from said ultrasonic pulse.

4. The scanner system of claim 3 in which said range means further includes means for generating a range signal from said echo signal and for providing said range signal to said control means.

5. The scanner system of claim 1 in which said means for altering includes a lens assembly through which the radiation beam is directed.

6. The scanner system of claim 5 in which said lens assembly includes a first lens incrementally adjustable to one of a plurality of positions relative to a second lens of said lens assembly.

7. The scanner system of claim 6 in which said means for altering further includes stepper motor means for adjusting the position of said first lens.

8. The scanner system of claim 1 in which said scanner means includes a radiation source for producing the radiation beam.

9. The scanner system of claim 8 in which said radiation source generates polarized radiation.

10. The scanner system of claim 8 in which said radiation source is a laser.

11. The scanner system of claim 1 further including means for detecting the presence of the object proximate the path of the radiation beam and for providing a presence signal to said control means.

12. The scanner system of claim 1 in which the object is movable relative to said scanner means and said range means is positioned to measure the range before the object enters the path of the radiation beam.

13. An automatic incremental focusing scanner system for optically reading a code pattern on an object, comprising:

scanner means for directing a light beam onto the object;

range means for measuring the range of the object relative to said scanner means;

said scanner means including a lens assembly having a first lens incrementally adjustable to one of a plurality of positions relative to a second lens to adjust the focal length of said lens assembly and selectively focus the light beam;

presence means for detecting when the object is proximate the path of the light beam of said scanner means; and control means, responsive to said range means and said presence means, for adjusting the focal length of said lens assembly based on the proximity of the object to the light beam path and based on the measured range to enable accurate reading of the code pattern.

14. The scanner system of claim 13 in which said range means includes means for emitting at least one pulse of radiation and means for receiving a reflected pulse derived from the pulse of radiation.

15. The scanner system of claim 13 in which the object is movable relative to said scanner means and said range means is positioned to measure the range before the object enters the path of the light beam.

* * * * *